(12) United States Patent
Kiso et al.

(10) Patent No.: US 9,822,704 B2
(45) Date of Patent: Nov. 21, 2017

(54) CONTROL METHOD FOR GASIFICATION POWER GENERATION SYSTEM

(71) Applicant: Mitsubishi Hitachi Power Systems, Ltd., Yokohama, Kanagawa (JP)

(72) Inventors: Fumihiko Kiso, Tokyo (JP); Yasuhiro Yoshida, Tokyo (JP); Hirotsugu Fukuhara, Yokohama (JP)

(73) Assignee: Mitsubishi Hitachi Power Systems, Ltd., Yokohama (JP)

(*) Notice: Subject to any disclaimer, the term of this patent is extended or adjusted under 35 U.S.C. 154(b) by 401 days.

(21) Appl. No.: 14/469,144

(22) Filed: Aug. 26, 2014

(65) Prior Publication Data

US 2015/0059351 A1 Mar. 5, 2015

(30) Foreign Application Priority Data

Sep. 5, 2013 (JP) .................................. 2013-183552

(51) Int. Cl.
*F02C 9/28* (2006.01)
*F02C 9/40* (2006.01)
(Continued)

(52) U.S. Cl.
CPC ................. *F02C 3/28* (2013.01); *C10J 3/466* (2013.01); *C10J 3/723* (2013.01); *C10K 1/101* (2013.01); *C10K 1/143* (2013.01); *F02C 9/28* (2013.01); *F02C 9/40* (2013.01); *F02C 9/50* (2013.01); *C10J 2300/0959* (2013.01); *C10J 2300/165* (2013.01); *C10J 2300/1653* (2013.01); *C10J 2300/1807* (2013.01); *C10J 2300/1884* (2013.01); *C10J 2300/1892* (2013.01); *F05B 2260/821* (2013.01); *F05B 2270/30* (2013.01);
(Continued)

(58) Field of Classification Search
None
See application file for complete search history.

(56) References Cited

U.S. PATENT DOCUMENTS 4,472,936 A * 9/1984 Uchiyama ................ F02C 3/28
422/111
4,489,562 A * 12/1984 Snyder ........................ C10J 3/08
48/197 R (Continued)

FOREIGN PATENT DOCUMENTS

JP 63-20388 A 1/1988
JP 63100237 A * 5/1988
(Continued)

OTHER PUBLICATIONS

English-language translation of JP63100237A.*
Patent Examination Report issued in counterpart Australian Application No. 2014218404 dated Sep. 3, 2015 (5 pages).

*Primary Examiner* — Gerald L Sung
*Assistant Examiner* — Scott Walthour
(74) *Attorney, Agent, or Firm* — Crowell & Moring LLP (57) ABSTRACT

The present invention relates to an operation control method for a gasification power generation system for gasifying carbon-based fuel such as coal in a gasifier using oxygen or oxygen-enriched air as an oxidizing agent, burning the obtained syngas as fuel in a gas turbine, driving the gas turbine by the syngas, driving a steam turbine by steam generated using exhaust heat of the gas turbine, thus executing combined power generation.

3 Claims, 7 Drawing Sheets

(51) Int. Cl.
   *F02C 9/50*   (2006.01)
   *C10J 3/72*   (2006.01)
   *F02C 3/28*   (2006.01)
   *C10J 3/46*   (2006.01)
   *C10K 1/10*   (2006.01)
   *C10K 1/14*   (2006.01)

(52) U.S. Cl.
   CPC ...... *F05D 2220/32* (2013.01); *F05D 2260/30* (2013.01); *F05D 2260/821* (2013.01); *F05D 2270/335* (2013.01); *Y02E 20/16* (2013.01)

(56) References Cited

U.S. PATENT DOCUMENTS

| | | | | |
|---|---|---|---|---|
| 2008/0147241 A1* | 6/2008 | Tsangaris | ................ | C03B 5/005 700/273 |
| 2008/0183362 A1* | 7/2008 | Dooley | .................... | F02C 3/20 701/100 |
| 2010/0058730 A1* | 3/2010 | Sonoda | ................... | F01D 21/14 60/39.12 |
| 2010/0229524 A1 | 9/2010 | Bhatnagar et al. | | |
| 2011/0162343 A1* | 7/2011 | Ouellet | ..................... | F02C 9/40 60/39.281 |
| 2011/0270502 A1* | 11/2011 | Demougeot | ........... | F02C 7/224 701/100 |
| 2012/0023822 A1* | 2/2012 | D'Agostini | .............. | C10J 3/723 48/61 |

FOREIGN PATENT DOCUMENTS

| | | | |
|---|---|---|---|
| JP | 63100237 A | * | 5/1988 |
| JP | 4-216896 A | | 8/1992 |
| JP | 2004-124851 A | | 4/2004 |
| JP | 2010-285564 A | | 12/2010 |
| KR | 10-2013-0015808 A | | 2/2013 |
| WO | WO 2008/081488 A1 | | 7/2008 |

* cited by examiner

[FIRST FUNCTION]

SYNGAS HEATING VALUE vs CARBON BASED FUEL FEED RATE (145)

FIG. 6B

[SECOND FUNCTION]

SYNGAS HEATING VALUE CORRECTION VALUE vs OXYGEN RATIO DEVIATION (146)

FIG. 7

CONTROL METHOD FOR GASIFICATION POWER GENERATION SYSTEM

CLAIM OF PRIORITY

The present application claims priority from Japanese patent application serial No. 2013-183552, filed on Sep. 5, 2013, the content of which is hereby incorporated by reference into this application.

TECHNICAL FIELD

The present invention relates to an operation control method for a gasification power generation system for gasifying carbon based fuel such as coal in a gasifier using oxygen or oxygen-enriched air as an oxidizing agent, burning the obtained syngas as fuel in a gas turbine, driving the gas turbine by the syngas, driving a steam turbine by steam generated using exhaust heat of the gas turbine, thus executing combined power generation.

BACKGROUND ART

The combined power generation using the gas turbine and steam turbine generates power by driving the gas turbine by high-temperature gas obtained by burring a power generation fuel such as natural gas, and furthermore, it recovers the heat of the exhaust gas of the gas turbine as steam so as to drive the steam turbine and thereby generate power; therefore, it is more efficient than the boiler power generation, which recovers the heat of the gas obtained by burning the power generation fuel as steam and driving the steam turbine.

As a method for executing the combined power generation using carbon based fuel such as coal as fuel, there is a gasification power generation system. In this system, the carbon based fuel in the gasifier is gasified using an oxidizing agent such as oxygen and the obtained syngas is used as fuel.

When executing the combined power generation using natural gas containing methane a main component as the power generation fuel, the heating value of the natural gas is almost constant, so that the air quantity for the natural gas fed to a gas turbine combustor is calculated using a preset heating value of the natural gas, thereby the combustion state in the gas turbine combustor can be maintained stably.

By contrast, when using the syngas obtained by gasifying the carbon based fuel as fuel for the gas turbine combustor, the ratio of the oxidizing agent such as oxygen used for gasification to the carbon based fuel needs to be adjusted depending on the operation state of the gasifier, so that the heating value of the syngas obtained in the gasifier is varied.

Further, for the pressure detection pipe in the gasifying process, to prevent the blocking by pulverized coal which is carbon based fuel, it is necessary to always feed a small quantity of purge nitrogen, though the nitrogen feed rate is generally set to a regulated flow rate by a hand valve, so that it is possible that the nitrogen feed rate will increase or decrease with lapse of time and as a result, the heating value of the syngas is varied.

For this reason, when the heating value of the syngas used for controlling the gas turbine is set to a fixed value, the real heating value of the syngas may exceed or fall below the value preset as a heating value of the syngas.

If the setting of the heating value of the syngas is different, the syngas quantity and air quantity that become fuel fed to the gas turbine combustor may become too much or too little and there are possibilities that the nitrogen oxide concentration and carbon monoxide concentration in the exhaust gas of the gas turbine discharged from the gas turbine may increase.

Further, there are possibilities that the flame going-out of the gas turbine combustor or the damage to the gas turbine combustor due to a high-temperature flame may be caused.

Therefore, when the carbon based fuel such as coal is gasified in the gasifier and the syngas is used as fuel of the gas turbine in a combined power generation plant, it is necessary to devise how to suppress the variation in the heating value of the syngas or set the heating value of the syngas used to control the gas turbine combustor to an appropriate value in the gasifying process of converting the carbon based fuel to syngas.

For example, in Japanese Patent Laid-open No. Sho 63 (1988)-20388 (Patent Literature 1), the heating value of the syngas is inferred from the concentration ratio of carbon monoxide to carbon dioxide in the gas sampled in the neighborhood of the gasifier outlet or from the gas temperature in the gas turbine combustor, and then the ratio of the carbon based fuel fed to the gasifier to oxygen is increased or decreased, thereby keeping the heating value of the syngas at the inlet of the gas turbine constant.

In Japanese Patent Laid-open No. 2010-285564 (Patent Literature 2), when the gasifier pressure is reduced, it is decided that the heating value has been reduced, and the carbon based fuel feed rate is increased, and when the gasifier pressure is increased inversely, it is decided that the heating value is increased, thereby the carbon based fuel feed rate is reduced, thus the heating value of the syngas is held fixed.

This method is valid when operating the system under the conditions that the power generation target is fixed and the carbon based fuel feed rate is almost constant. However, when the power generation output need to be changed, the gasifier pressure varies due to a factor other than the variation of the heating value of the syngas, so that a problem arises that the heating value of the syngas cannot be kept constant.

In Japanese Patent Laid-open No. 2004-124851 (Patent Literature 3), from the equipment between the gasifier and the gas turbine or the pipes, the syngas is sampled, and the concentrations of the carbon monoxide and carbon dioxide are measured, and from the ratio of the carbon monoxide and carbon dioxide, the heating value of the syngas is inferred. Further, in the pipe between the gasifier and the gas turbine, the flow rate of the syngas is measured, and the arrival time of the syngas from the gas sampling position to the gas turbine is calculated, and in consideration of this time, the flow rate is set as a heating value of the syngas at the gas turbine inlet. This method is valid when the time required from sampling of the syngas to obtaining of the analytical results is short.

CITATION LIST

Patent Literature

{Patent Literature 1} Japanese Patent Laid-open No. Sho 63 (1988)-20388
{Patent Literature 2} Japanese Patent Laid-open No. 2010-285564
{Patent Literature 3} Japanese Patent. Laid-open No. 2004-124851

SUMMARY OF INVENTION

Technical Problem

In the method disclosed in Japanese Patent. Laid-open No. Sho 63 (1988)-20388 (Patent Literature 1) mentioned above, the ratio of the carbon based fuel to oxygen is adjusted after the heating value of the syngas obtained from the results of the syngas sampled and analyzed or the gas temperature in the gas turbine combustor is changed. However, since time is taken until the heating value at the gas turbine inlet is changed after the ratio of the carbon based fuel to oxygen is changed, it takes a lot of time until the heating value once changed at the gas turbine inlet is returned to its original value. Further, the ratio of the carbon based fuel to oxygen is varied depending on the state in the gasifier, so that the heating value of the syngas may not be set at a value for keeping it constant.

Further, the method disclosed in Japanese Patent Laid-open No. 2010-285564 (Patent Literature 2) is valid when operating the system under the conditions that the power generation target is fixed and the carbon based fuel feed rate is almost constant. However, when the power generation output needs to be changed, the gasifier pressure varies due to a factor other than the variation of the heating value of the syngas, so that a problem arises that the heating value of the syngas cannot be kept constant.

Further, in the method disclosed in Japanese Patent Laid-open No. 2004-124851 (Patent Literature 3), the gasifier is operated at a pressure of approximately 3 MPa, so that to lead the syngas to an analyzer, a pressure reducing valve needs to be installed on the sampling pipe. Further, when the analyzer is damaged, an operation such as removing the analyzer is necessary; however, to prevent gas including carbon monoxide and hydrogen from leaking outside the system at the time of the operation, a plurality of shielding valves needs to be installed on the sampling pipe.

Further, to analyze the as composition by a gas chromatography or an infrared absorption method, water obstructing the gas composition analysis needs to be removed. For that purpose, it is necessary to lower the gas temperature by indirect heat exchange and remove the moisture in the gas by adsorbing it to an adsorption agent as a liquid, though, a pipe long enough to lower the gas temperature needs to be reserved.

Further, to prevent the analyzer from direct exposure to wind and rain and from the viewpoint of the maintenance property, the pipe length from the sampling position to the analyzer may become further longer. Therefore, the time required from bleeding the syngas from the pipe to obtaining of the analytical results of the as composition becomes longer than the time required until the heating value of the syngas at the gas turbine inlet changes, so that the heating value of the syngas at the gas turbine inlet may not be set appropriately.

An object of the present invention is to provide a control method for a gasification power generation system for maintaining stably the combustion of the gas turbine combustor by accurately setting the heating value of the syngas generated in the gasifier used to control the gas turbine and allowing the syngas quantity and air quantity fed to the gas turbine combustor to be adjusted to appropriate values even when the power generation output fluctuates depending on the electricity demand.

Solution to Problem

A control method for a gasification power generation system of the present invention, including a gasifying equipment for gasifying carbon based fuel by an oxidizing agent in a gasifier and generating syngas, a gas clean-up unit for obtaining a syngas purified by removing a sulfur compound in the syngas generated in the gasifier, and a gas turbine equipment for generating power by burning the purified syngas obtained by the gas clean-up unit as fuel, comprising the steps of:

inferring a syngas heating value at a gasifier outlet and a syngas quantity from a property and a feed rate of the carbon based fuel fed to the gasifier of the gasifying equipment, a flow rate of nitrogen or water used for transport of the carbon based fuel to the gasifier, and a property and a feed rate of the oxidizing agent fed to the gasifier;

analyzing syngas sampled from instruments or pipes between the gasifier of the gasifying equipment and the gas turbine equipment, and correcting the inferred value of the syngas heating value using analytical values of the sampled syngas; inferring a time lag until the syngas heating value is changed at a gas turbine equipment inlet after the feed rate of the carbon based fuel fed to the gasifier is changed from the inferred value of the syngas quantity, volumes of the instruments and the pipes between the gasifier of the gasifying equipment and the gas turbine equipment, and a temperature and a pressure of the syngas in the instruments and the pipes; and setting, the syngas heating value inferred from the feed rate of the carbon based fuel fed to the gasifier as a syngas heating value used to control the gas turbine equipment after the time lag and controlling the gas turbine equipment.

Further, a control method for a gasification power generation system of the present invention, including a gasifying equipment for gasifying carbon based fuel by an oxidizing agent in a gasifier and generating syngas, a gas clean-up unit for obtaining syngas purified by removing a sulfur compound in the syngas generated in the gasifier, and a gas turbine equipment for generating power by burning the purified syngas obtained by the gas clean-up unit as fuel, comprising the steps of: inferring a syngas heating value at a gasifier outlet under a condition that a ratio of a feed rate of the carbon based fuel fed to the gasifier of the gasifying equipment to a feed rate of the oxidizing agent is constant, using a first function showing a relation between the feed rate of the carbon based fuel fed to the gasifier and a syngas heating value at a gasifier outlet, from the feed rate of the carbon based fuel fed to the gasifier; correcting the syngas heating value at the gasifier outlet using a second function showing a variation of the syngas heating value at the gasifier outlet when the ratio of the feed rate of the carbon based fuel to the feed rate of the oxidizing agent for which the first function is prepared is changed; analyzing the syngas sampled from instruments or pipes between the gasifier of the gasifying equipment and the gas turbine equipment, and correcting the inferred value of the syngas heating value using analytical values of the sampled syngas; inferring a time lag until the generated heating value is changed at a gas turbine equipment inlet after the feed rate of the carbon based fuel fed to the gasifier is changed from a syngas quantity measured by a gas flow rate meter installed on pipes connecting instruments and instruments between the gasifier of the gasifying equipment and the gas turbine equipment, volumes of the instruments and the pipes between the gasifier and the gas turbine equipment, and as temperatures and pressures in the instruments and the pipes; and setting the syngas heating value inferred from the feed rate of the carbon based fuel fed to the gasifier as a syngas heating value used to control the gas turbine equipment after the time lag and controlling the gas turbine equipment.

Advantageous Effects of Invention

According to the present invention, even when the power generation output fluctuates depending on the electricity demand, the heating value of the syngas generated in the gasifier used to control the gas turbine is set accurately and the syngas quantity and air quantity fed to the gas turbine combustor can be adjusted to appropriate values, so that a control method for a gasification power generation system maintaining stably the combustion of the gas turbine combustor can be realized.

DESCRIPTION OF EMBODIMENTS

The control method for the gasification power generation system which is an embodiment of the present invention will be explained below by referring to the drawings.

{Embodiment 1}

The control method for the gasification power generation system which is the first embodiment of the present invention will be explained below by referring to FIGS. 1 to 3.

The outline of the gasification power generation system which is the first embodiment of the present invention shown in FIG. 1 will be explained.

Figure 1:
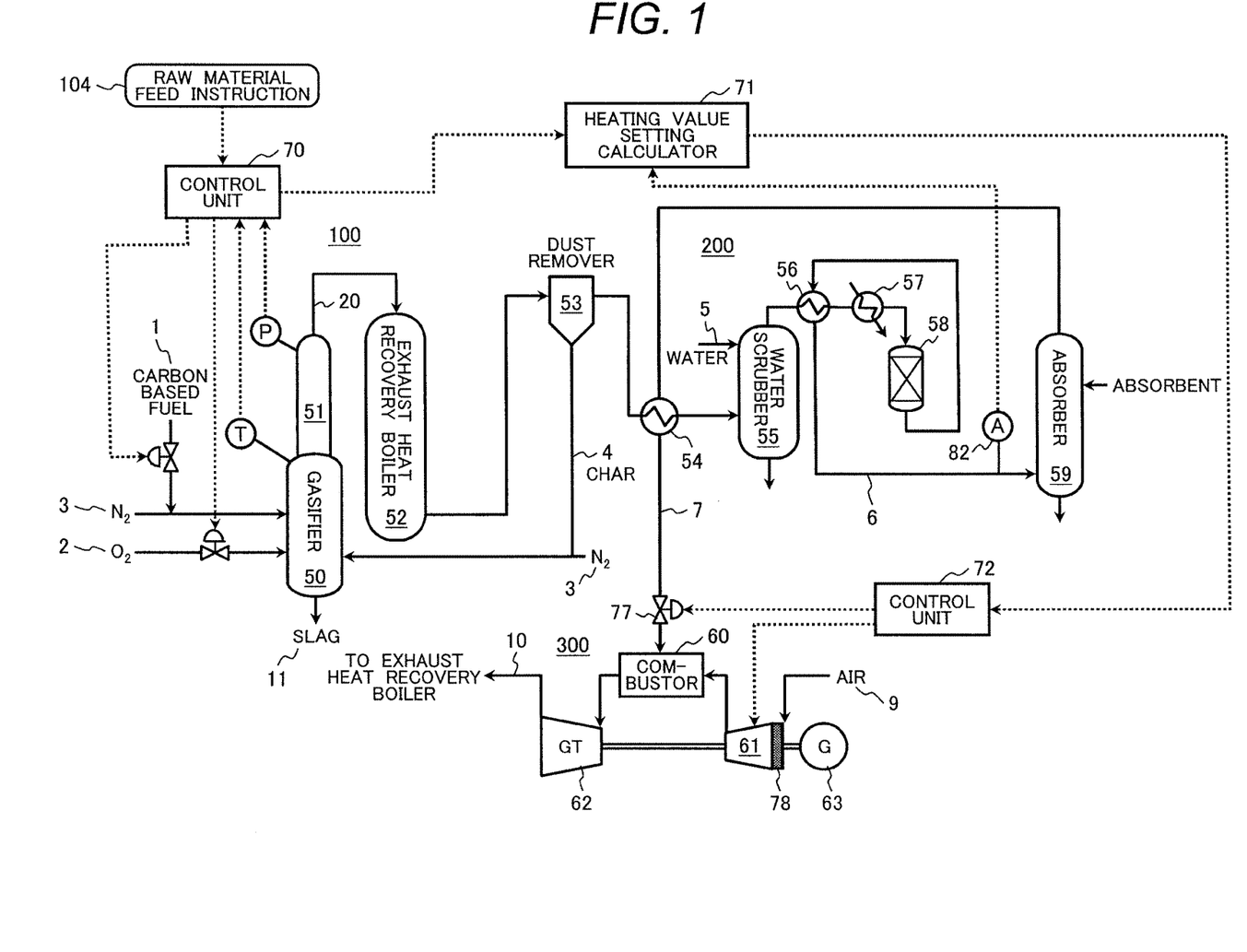
FIG. 1 is a system configuration diagram showing the gasification power generation system of the first embodiment of the present invention setting the heating value of the syngas at the gas turbine inlet used to control the gas turbine equipment from the raw material feed rate to the gasifier.

In the gasification power generation system of this embodiment shown in FIG. 1, in the gasification power generation system of this embodiment, carbon based fuel 1 such as coal is transferred to a gasifier 50 configuring gasifying equipment 100 by nitrogen 3. The carbon based fuel 1 may be fed to the gasifier 50 as water slurry.

An oxidizing agent 2 such as oxygen and oxygen-enriched air is fed to the gasifier 50. In the gasifier 50, the carbon based fuel 1 and the oxidizing agent 2 such as oxygen or oxygen-enriched air react on each other and the carbon based fuel 1 is gasified.

Syngas 20 obtained by a reaction of the carbon based fuel 1 to the oxidizing agent 2 in the gasifier 50 is composed of carbon monoxide, carbon dioxide, hydrogen, steam, methane, nitrogen, hydrogen sulfide, and carbonic sulfide etc. The temperature of syngas in the gasifier 50 is held a value which the ash in the carbon based fuel is melting, and the ash is melted and becomes slag 11. Then the slag 11 is discharged from the lower portion of the gasifier 50.

The sensible heat in the syngas 20 coming out from the gasifier 50 is recovered as steam by a heat recovery part 51 installed in the gasifier 50 and an exhaust heat recovery boiler 52. The steam obtained by the heat recovery part 51 and the exhaust heat recovery boiler 52 is used for power generation by a steam turbine (not shown), thus the power generation efficiency can be improved.

On the downstream side of the exhaust heat recovery boiler 52, by a dust remover 53 configuring the gas clean-up unit 200, fine particles in the syngas 20 are removed. The fine particles in the syngas 20 are called a char 4 and the main component thereof is unreacted carbon.

In the gasifier 50, a control unit 70 for controlling the gasifier 50 is installed and controls the feed rates of the carbon based fuel 1 and the oxidizing agent 2 fed to the gasifier 50.

To effectively use the carbon content in the carbon based fuel 1, the fine particles collected by the dust remover 53, as shown in FIG. 1, are fed into the gasifier 50 and are recycled.

In the gasification power generation system of this embodiment, the char 4 collected by the dust remover 53 for recycling is transferred to the gasifier 50 using nitrogen 3, though the char 4 may be fed to the gasifier 50 as water slurry.

The syngas 20 with the fine particles collected by the dust remover 53 removed is fed to a water scrubber 55 configuring gas clean-up unit 200 from the dust remover 53 and makes contact with washing water 5 in the water scrubber 55, thus the halogen in the syngas 20 is removed.

The syngas 20 coming out from the water scrubber 55 is fed to a carbonic sulfide converter 58 configuring the gas clean-up unit 200 and by the carbonic sulfide converter 58, the carbonic sulfide in the syngas 20 is converted to hydrogen sulfide using a catalyst.

Here, the reason that the carbonic sulfide needs to be converted to hydrogen sulfide is that when using an absorbent such as methyl diethanol amine in an absorber 59 on the downstream side configuring the gas clean-up unit 200, the carbonic sulfide is not absorbed to the absorbent.

Further, a catalyst is necessary in the process of converting the carbonic sulfide to hydrogen sulfide, and the operation temperature of the catalyst is about 200° C., so that the syngas 20 after coming out from the water scrubber 55 needs to be raised in temperature, thus by a gas-gas heat exchanger 56 and a heater 57 which are arranged between the water scrubber 55 and the carbonic sulfide converter 58, the syngas 20 is raised in temperature.

After the hydrogen sulfide is removed by the absorber 59, syngas 7 raised in temperature by a gas-gas heat exchanger 54 is fed as fuel to a gas turbine combustor 60 configuring gas turbine equipment 300.

In the gas turbine equipment 300, a gas turbine control unit 72 for controlling the gas turbine equipment 300 is installed and the gas turbine control unit 72, using a syngas heating value set value of the syngas 7 fed to the gas turbine compustor 60, calculates the fuel flow rate for satisfying a power generation output instruction, controls a fuel flow rate control valve 77, and adjusts the fuel flow rate of the fuel syngas 7.

A heating value setting calculator 71 for calculating the set value of the heating value of the syngas 7 fed to the gas turbine equipment 300 on the basis of the output of the control unit 70 of the gasifier 50 and the detection value of an absorber inlet gas composition analyzer 82 which is the gas composition of syngas 6 before desulfurization in the gas clean-up unit 200, is provided and the gas turbine control unit 72 is configured so that it calculates a control signal by the output of the heating value set value of the syngas 7 which is calculated by the heating value setting calculator 71 for setting the heating value of the syngas 7, operates the opening angle of the fuel flow rate control valve 77 on the basis of the operation signal calculated by the gas turbine control unit 72, appropriately adjusts the fuel flow rate of the syngas 7 fed to the gas turbine combustor 60 of the gas turbine equipment 300, and thereby controls the gas turbine equipment 300.

Further, the gas turbine control unit 72 is configured so as to control the gas turbine equipment 300 by calculating the air quantity corresponding to the fuel flow rate of the syngas 7 fed to the gas turbine combustor 60 of the gas turbine equipment 300, operating a gas turbine air flow rate control valve 78 on the basis of the operation signal calculated by the gas turbine control unit 72, and appropriately adjusting the flow rate of air 9 fed to a as turbine compressor 61 configuring the gas turbine equipment 300.

In the gas turbine equipment 300, the air 9 for combustion is pressurized by the gas turbine compressor 61 and is fed to the gas turbine compressor 60. And, by the as turbine combustor 60, the syngas 7 of fuel and the air 9 for combustion are mixed and burned, and high-temperature gas generated by the gas turbine combustor 60 is fed to a gas turbine 62 to drive the gas turbine 62, and a generator 63 connected to the gas turbine 62 is driven to obtain electric power.

Then, exhaust gas 10 coming out from the gas turbine 62 is fed to another exhaust heat recovery boiler (not shown) and the sensible heat of the exhaust gas 10 is recovered as steam.

The steam generated by the other exhaust heat recovery boiler is fed to a steam turbine (not shown), and the steam turbine is driven and used to generate power, thus the power generation efficiency is improved.

As mentioned above, the heating value setting calculator 71 for setting the heating value of the syngas on the basis of the output of the control unit 70 of the gasifier 50 and the detection value of the absorber inlet gas composition analyzer 82 which is the gas composition of the syngas 6 before desulfurization in the gas clean-up unit 200, is installed, and the gas turbine control unit 72 for controlling the gas turbine equipment 300 on the basis of the operation signal calculated by the heating value setting calculator 71 is installed.

Figure 2:
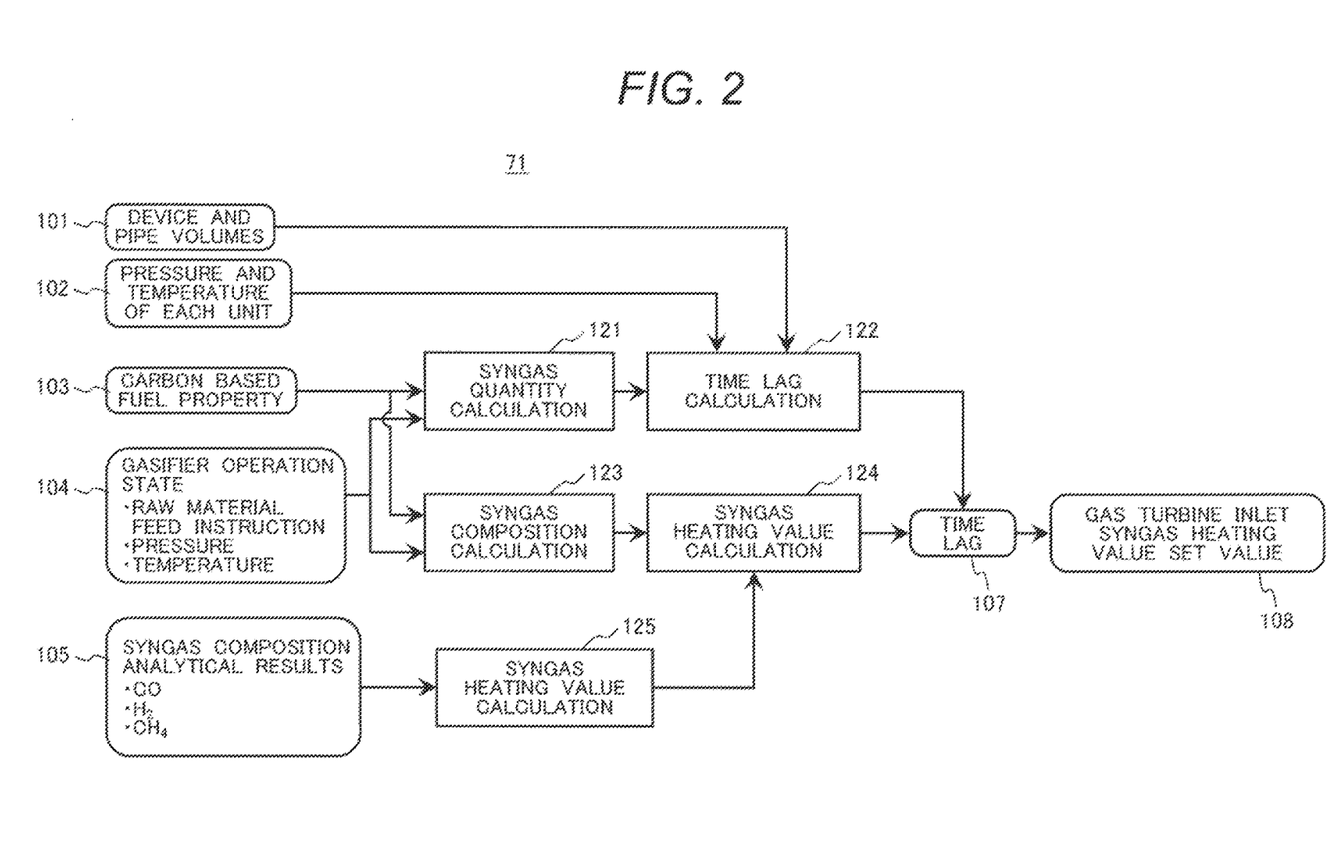
FIG. 2 is, in the control method for the gasification power generation system of the first embodiment, a control block diagram showing the heating value setting calculator for setting the heating value of the syngas at the gas turbine inlet used to control the gas turbine equipment from the raw material feed rate to the gasifier.

Next, using FIG. 2, the setting method for the syngas heating value at the inlet, of the gas turbine equipment 300 in the gasification power generation system of this embodiment shown in FIG. 1 will be shown.

In the heating value setting calculator 71 for setting the syngas heating value at the inlet of the gas turbine equipment 300 in the gasification power generation system of this embodiment shown in FIG. 2, firstly, property (results of proximate analysis, results of ultimate analysis) 103 of the carbon based fuel 1 fed to the gasifier 50 of the gasifying equipment 100 and an operation state (raw material feed instruction, pressure, temperature) 104 of the gasifier 50 are input to the gasifying reaction model installed on the heating value setting calculator 71, and the operation of syngas composition calculation 123 for calculating the composition of the syngas 20 at the gasifier outlet 50 for generating the syngas 20 by gasifying the carbon based fuel 1 in the gasifier 50 and the operation of syngas flow rate calculation 121 are executed.

Next, the calculation value of the syngas composition operated by the syngas composition calculation 123 is input to syngas heating value calculation 124 installed on the heating value setting calculator 71 and the calculation of the syngas heating value is executed.

Here, among the raw material feed instruction 104, the nitrogen 3 used to transfer the carbon based fuel 1 to the gasifier 50 is corrected by the nitrogen feed rate correction value obtained by the following means.

The nitrogen feed rate correction value of the raw material feed instruction 104 is obtained in a state where the power generation output is constant. Firstly, using syngas composition analytical results 105 sampled from the equipment or pipes between the gasifier 50 and the gas turbine equipment 300, the operation of syngas heating value calculation 125 installed on the heating value setting calculator 71 is executed.

The syngas heating value calculation 125 is desirably obtained by a method of multiplying the concentration of carbon monoxide, hydrogen, or methane by the corresponding heating value, though a method of inferring on assumption that each concentration is in proportion to the concentration of carbon monoxide with a highest concentration may be used.

Further, using the ratio of carbon monoxide to carbon dioxide which can be measured by an analyzer by the infrared absorption method, the syngas heating value may be inferred.

Then, the nitrogen feed rate correction value to the gasifier 50 is set so that the syngas heating value operated by the syngas heating value calculation 124 which is inferred using the gasifying reaction model installed on the heating value setting calculator 71 becomes equal to the syngas heating value operated by the syngas heating value calculation 125 from the syngas composition analytical results 105 by the gas analyzer.

Concretely, when the value of the syngas heating value operated by the syngas heating value calculation 124 using raw material feed to the gasifier 50 is larger than the value of the syngas heating value operated by the syngas heating value calculation 125 using the gas analytical results, the nitrogen feed rate of the nitrogen 3 fed to the gasifier 50 is increased until the two become equal to each other, and the increased nitrogen feed rate of the nitrogen 3 is assumed as a nitrogen feed rate correction value.

Inversely, when the value of the syngas heating value operated by the syngas heating value calculation 124 using raw material feed to the gasifier 50 is smaller than the value of the syngas heating value operated by the syngas heating value calculation 125 using the gas analytical results, the nitrogen feed rate of the nitrogen 3 fed to the gasifier 50 is decreased until the two become equal to each other, and the decreased nitrogen feed rate of the nitrogen 3 is assumed as a nitrogen feed rate correction value.

Next, on the basis of the syngas quantity inferred value operated by the syngas flow rate calculation 121, a instrument-pipe volume 101 between the gasifier 50 and the gas turbine equipment 300, and pressure-temperature of each unit 102, by time lag calculation 122 installed on the heating value setting calculator 71, the calculation of the time lag after the raw material feed to the gasifier 50 of the gasifying equipment 100 is changed until the heating value at the gas turbine inlet is changed is executed.

Here, as for the pressure-temperature of each unit 102, when a pressure gauge and a thermometer are installed on the devises and pipes, they are used and when there are no measured values available, material balance and heat balance planned values are input to the heating value setting calculator 71 and are used.

The time lag operated by the time lag calculation 122 is assumed as a time lag 107 after the raw material feed to the gasifier 50 is changed until the heating value at the gas turbine inlet is changed and the syngas heating value obtained by the gasifier model is assumed as a syngas heating value set value 108 at the gas turbine inlet at the time with the time lag added to the time the raw material feed to the gasifier 50 changed.

Figure 3A:
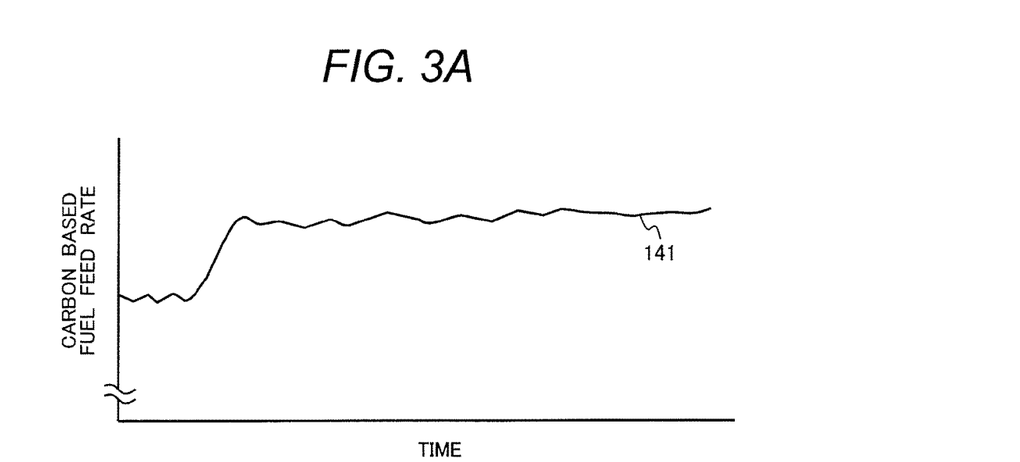
FIG. 3A is an illustration showing schematically the change with time of the feed rate of the carbon based fuel to the gasifier in the control method for the gasification power generation system of the first embodiment.
Figure 3B:
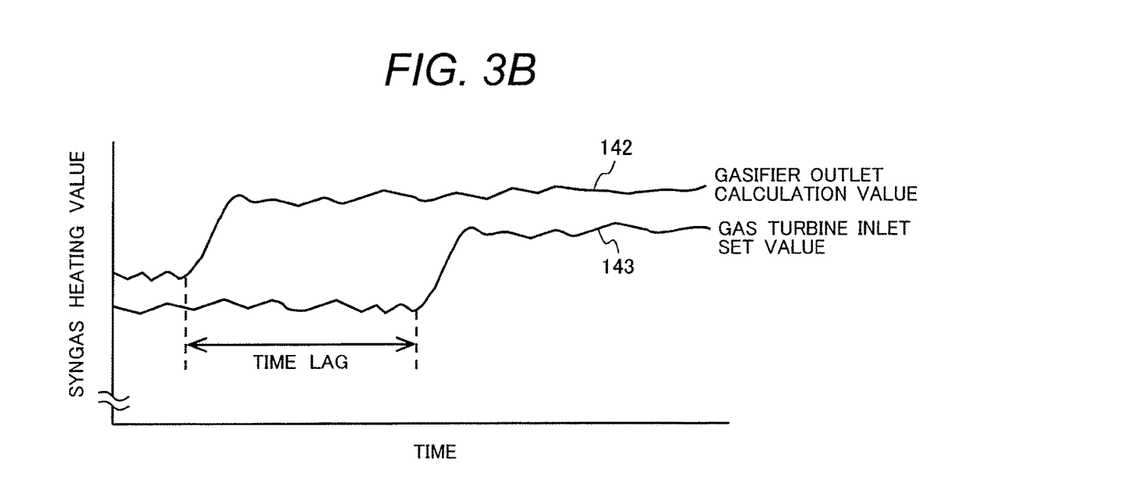
FIG. 3B is an illustration showing schematically the calculation value of the syngas heating value at the gasifier outlet in the control method for the gasification power generation system of the first embodiment and the change with time of the set value of the syngas heating value at the gas turbine inlet.

Incidentally, the residence time of the carbon based fuel in the gasifier 50 is short, so that as in the schematic diagram shown in FIG. 3A, if a feed rate 141 of the carbon based fuel to the gasifier 50 is changed, as in the schematic diagram shown in FIG. 3B, a syngas heating value calculation value 142 at the gasifier outlet 50 is changed promptly.

Therefore, the time lag due to existence of various instruments and pipes between the gasifier outlet 50 and the gas turbine inlet is set appropriately, thus as in the schematic diagram shown in FIG. 3B, a heating value set value 143 at the gas turbine inlet, the air flow rate for the syngas flow rate can be set appropriately in correspondence to the real heating value change changing in correspondence to the change of the feed rate 141 of the carbon based fuel to the gasifier 50 shown in the schematic diagram in FIG. 3A, thus the combustion state of the gas turbine combustor 60 can be maintained stably.

In the gasification power generation system of this embodiment, in the gas turbine control unit 72, the heating value setting calculator 71 for calculating the set value of the heating value of the syngas 7 fed to the gas turbine equipment 300 on the basis of the output of the control unit 70 of the gasifier 50 and the detection value of the absorber inlet gas composition analyzer 82 which is the gas composition of the syngas 6 before desulfurization in the gas clean-up unit 200 is installed, so that the gas turbine control unit 72 calculates a control signal by the output of the heating value set value of the syngas 7 which is calculated by the heating value setting calculator 71 for setting the heating value of the syngas 7, operates the opening angle of the fuel flow rate control valve 77 on the basis of the operation signal calculated by the gas turbine control unit 72, appropriately adjusts the fuel flow rate of the syngas 7 fed to the gas turbine combustor 60 of the gas turbine equipment 300, and thereby controls the gas turbine equipment 300.

Further, the gas turbine control unit 72 calculates the air quantity corresponding to the fuel flow rate of the syngas 7 fed to the gas turbine combustor 60 of the gas turbine equipment 300, operates the gas turbine air flow rate control valve 78 on the basis of the operation signal calculated by the gas turbine control unit 72, appropriately adjusts the flow rate of the air 9 fed to the gas turbine compressor 61 configuring the gas turbine equipment 300, and thereby controls the gas turbine equipment 300.

According to this embodiment, even when the power generation output fluctuates depending on the electricity demand, the heating value of the syngas generated in the gasifier used to control the gas turbine is set accurately and the syngas quantity and air quantity fed to the gas turbine combustor can be adjusted to appropriate values, so that a control method for a gasification power generation system for maintaining stably the combustion of the gas turbine combustor can be realized.

Further, as an additional effect of this embodiment, the aforementioned control method for the gasification power generation system is realized, so that the increase of the discharge quantity of nitrogen oxide or carbon monoxide is suppressed and troubles such as flame going-out of the gas turbine combustor and damage to the gas turbine combustor due to a high-temperature flame can be prevented.

{Embodiment 2}

The control method for the gasification power generation system which is the second embodiment of the present invention will be explained below by referring to FIGS. 4 to 6.

The control method for the gasification power generation system of this embodiment shown in FIGS. 4 to 6 has the basic configuration same as that of the control method for the gasification power generation system of the first embodiment shown in FIGS. 1 to 3, so that the explanation of the configuration common to the two is omitted and only the different configuration will be explained below.

Figure 4:
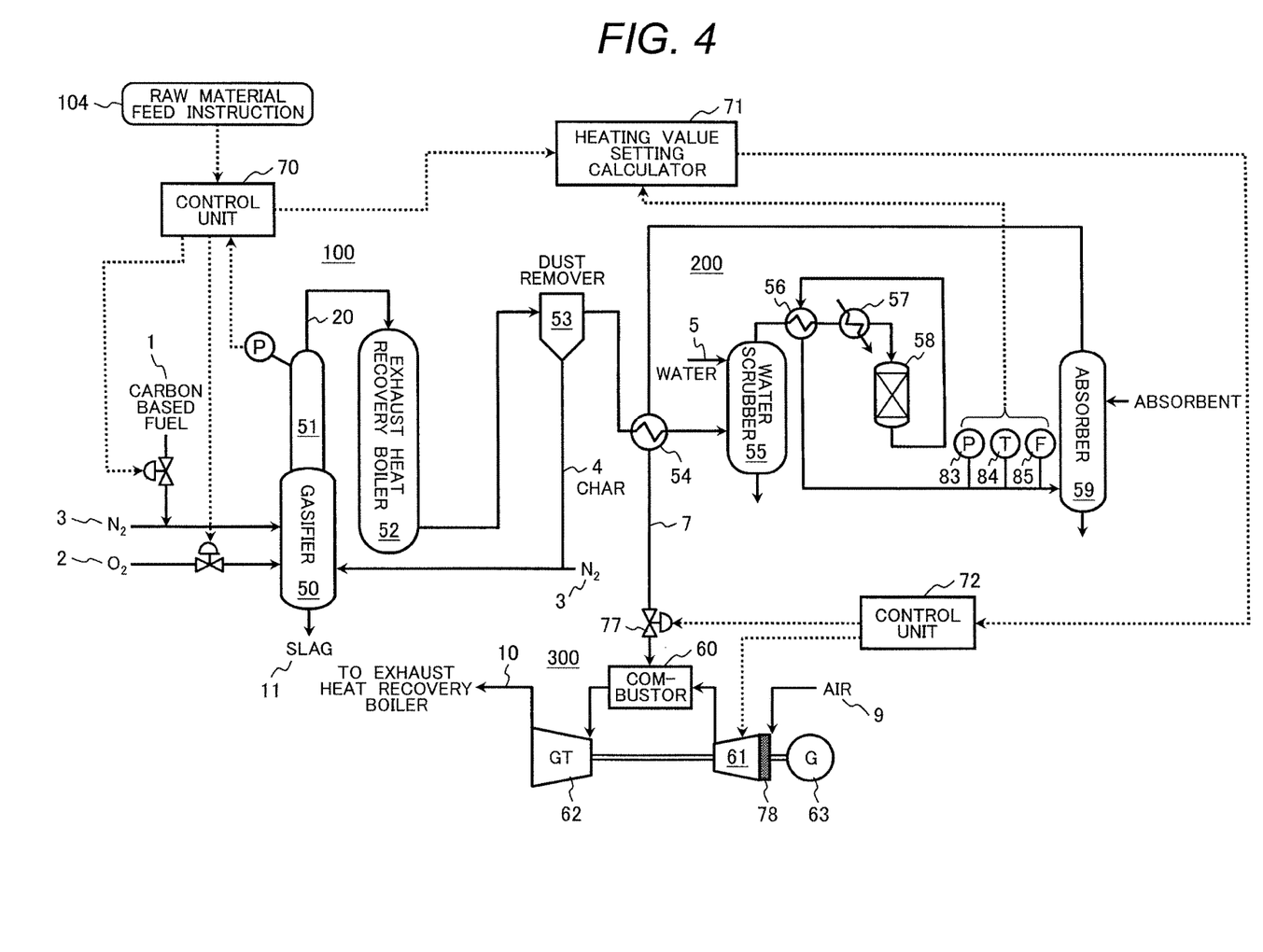
FIG. 4 is a system configuration diagram showing the gasification power generation system of the second embodiment of the present invention setting the heating value of the syngas at the gas turbine inlet used to control the gas turbine equipment from the raw material feed rate to the gasifier.
Figure 5:
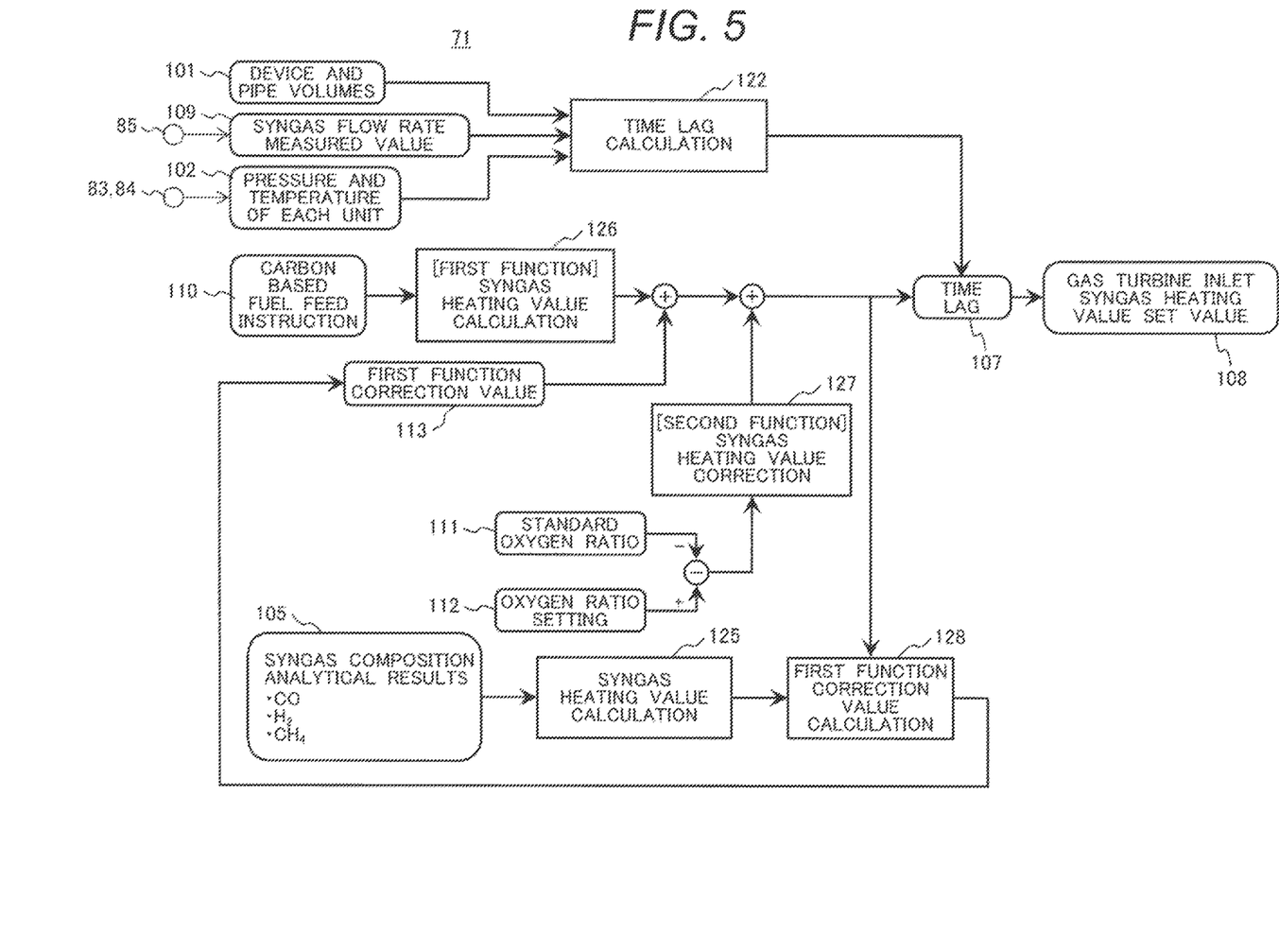
FIG. 5 is, in the control method for the gasification power generation system of the second embodiment, a control block diagram showing the heating value setting calculator which calculates the heating value of the syngas using a function and sets the heating value of the syngas at the gas turbine inlet used to control the gas turbine equipment.
Figure 6A:
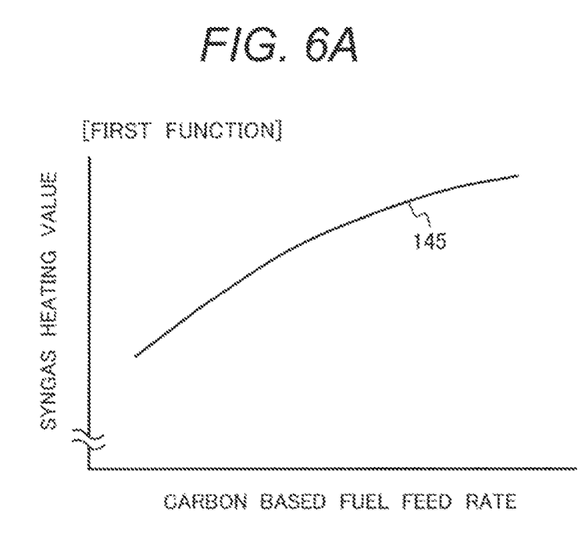
FIG. 6A is an illustration showing schematically a first function used when setting the heating value of the syngas at the gas turbine inlet used to control the gas turbine equipment from the raw material feed rate to the gasifier in the control method for the gasification power generation system of the second embodiment.
Figure 6B:
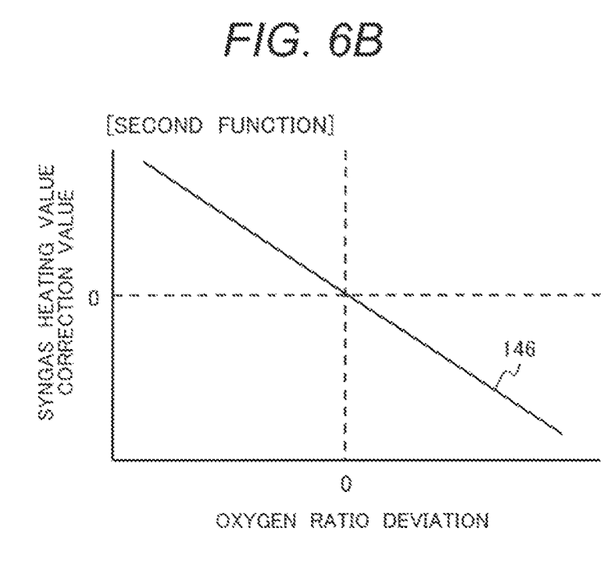
FIG. 6B is an illustration showing schematically a second function used when setting the heating value of the syngas at the gas turbine inlet used to control the gas turbine equipment from the raw material feed rate to the gasifier in the control method for the gasification power generation system of the second embodiment.

The control method for the gasification power generation system of this embodiment shown in FIGS. 4 to 6 shows another method of calculating the syngas heating value using a function and obtaining syngas heating value setting at the gas turbine inlet.

The configuration of the gasification power generation system of this embodiment shown in FIG. 4 to which the control method for the gasification power generation system of this embodiment is applied is that in addition to the gasification power generation system of the first embodiment shown in FIG. 1, a flow rate meter 85 is installed at the absorber inlet and, as a syngas flow rate measured value of the syngas 6 before desulfurization flowing down through the gas clean-up unit 200, the syngas flow rate is measured, and similarly, each measured result of a pressure gauge 83 and a thermometer 84 installed in this portion is input to the heating value setting calculator 71 for setting the heating value of the syngas 7 fed to the gas turbine equipment 300, and the heating value set value corrected by the heating value setting calculator 71 is used.

The temperature at the inlet of the absorber 56 configuring the gas clean-up unit 200 is lowered down to about 40° C. when an amine solution is used as an absorbent, so that from the viewpoint of that there is no need particularly to use a heat resistant specification for the gas flow rate meter 85, it is suitable for setting of the gas flow rate meter 85 in this portion.

And, in the gasification power generation system of this embodiment, in the heating value setting calculator 71 shown in FIG. 5 for setting the syngas heating value at the inlet of the gas turbine equipment 300, firstly, a carbon based fuel feed rate instruction 110 fed to the gasifier 50 is input to a first function 126 for performing the syngas heating value calculation which is installed on the heating value setting calculator 71, and the syngas heating value of the syngas 20 generated in the gasifier 50 is calculated.

The specific characteristic of the first function 126, as shown in FIG. 6A, is that the relation of the syngas generation rate to the carbon based fuel feed rate has a specific characteristic of a rightward-rising curve 145. The reason is as shown below. Namely, the reason is that the feed rate of the carbon based fuel 1 fed to the gasifier 50 increases, thus the syngas quantity of the syngas 20 generated by gasifying the carbon based fuel 1 in the gasifier 50 increases, and the ratio of the purge nitrogen relatively reduces, so that in correspondence to it, the syngas heating value increases.

Further, if the feed rate of the carbon based fuel 1 fed to the gasifier 50 increases, the generation heat in correspondence to the gasification of the syngas 20 generated by gasifying the carbon based fuel 1 in the gasifier 50 becomes larger and the temperature maintenance becomes easy, so that the standard oxygen ratio can be reduced.

If the standard oxygen ratio of the syngas 20 is reduced, the carbon monoxide concentration and hydrogen concentration in the syngas 20 increase and the carbon dioxide concentration and steam concentration are reduced. Therefore, the heating value of the syngas 20 increases.

To the syngas heating value of the syngas 20 obtained by the first function 126, a correction value 113 of the first function, which was calculated at block 128 in FIG. 5, is added.

In the heating value setting calculator 71 shown in FIG. 5, furthermore, the calculation of the syngas heating value correction is performed in such a way that the deviation between oxygen ratio (the feed rate of the oxidizing agent 2 the feed rate of the carbon based fuel 1) setting 112 and a standard oxygen ratio 111 is obtained, and the deviation is input to a second function 127 for performing the syngas heating value correction which is installed on the heating value setting calculator 71, and the syngas heating value correction value of the syngas 20 is obtained, and the syngas heating value correction value obtained by the second function 127 is further added to the added value with a correction value 113 of the first function added to the syngas heating value of the syngas 20 obtained by the first function 126.

The specific characteristic of the second function 127, as shown in FIG. 6B, is that the relation of the syngas heating value correction value to the oxygen ratio deviation has a specific characteristic of a rightward-reducing curve 146. The reason is that if the oxygen ratio increases, the carbon monoxide concentration and hydrogen concentration in the syngas 20 reduce and the carbon dioxide concentration and steam concentration increase, thus the syngas heating value reduces.

Next, from the instrument-pipe volume 101, the syngas flow rate measured value 109, and the pressure-temperature of each unit 102, the time lag calculation 122 is executed, and the time lag in the syngas 20 reaching the gas turbine inlet of the gas turbine equipment 300 from the gasifier outlet 50 is obtained.

Here, as a syngas flow rate measured value, as shown in the gasification power generation system in FIG. 5, by the flow rate meter 85 installed at the absorber inlet 56 configuring the gas clean-up unit 200, the syngas flow rate is measured and used, and similarly, using the results measured by the pressure gauge 83 and the thermometer 84 installed in this portion, the operation of the time lag calculation 122 for calculating the time lag 107 until the heating value is changed at the gas turbine inlet after the raw material feed to the gasifier 50 is changed is performed.

On the basis of the time lag 107 obtained by the operation of the time lag calculation 122, the syngas heating value of the syngas 20 at the gasifier outlet 50 is delayed by the time lag 107 after the correction and is set as a heating value set value 108.

Even in the gasification power generation system of this embodiment, the heating value setting calculator 71 for calculating the set value of the heating value of the syngas 7 fed to the gas turbine equipment 300 is installed, so that, the gas turbine control unit 72 calculates the control signal by the output of the heating value set value of the syngas 7 operated by the heating value setting calculator 71 for setting the heating value of the syngas 7, operates the opening angle of a fuel flow rate control valve 77 on the basis of the operation signal calculated by the gas turbine control unit 72, appropriately adjusts the fuel flow rate of the syngas 7 fed to the gas turbine combustor 60 of the gas turbine equipment 300, and thereby controls the gas turbine equipment 300.

Further, the gas turbine control unit 72 calculates also the air quantity corresponding to the fuel flow rate of the syngas 7 fed to the gas turbine combustor 60 of the gas turbine equipment 300, operates the gas turbine air flow rate control valve 78 on the basis of the operation signal calculated by the gas turbine control unit 72, appropriately adjusts the flow rate of the air 9 fed to the gas turbine compressor 61 configuring the gas turbine equipment 300, and thereby controls the gas turbine equipment 300.

According to this embodiment, even when the power generation output fluctuates depending on the electricity demand, the heating value of the syngas generated in the gasifier used to control the as turbine is set accurately and the syngas quantity and air quantity fed to the gas turbine combustor can be adjusted to appropriate values, so that a control method for a gasification power generation system for maintaining stably the combustion of the gas turbine combustor can be realized.

Further, as an additional effect of this embodiment, the aforementioned control method for the gasification power generation system is realized, so that the increase of the discharge quantity of nitrogen oxide or carbon monoxide is suppressed and troubles such as flame going-out of the gas turbine combustor and damage to the gas turbine combustor due to a high-temperature flame can be prevented.

{Embodiment 3}

The control method for the gasification power generation system which is the third embodiment of the present invention will be explained below by referring to FIG. 7.

The control method for the gasification power generation system of this embodiment shown in FIG. 7 has the basic configuration same as that of the control method for the gasification power generation system of the first embodiment shown in FIGS. 1 to 3, so that the explanation of the configuration common to the two is omitted and only the different configuration will be explained below.

Figure 7:
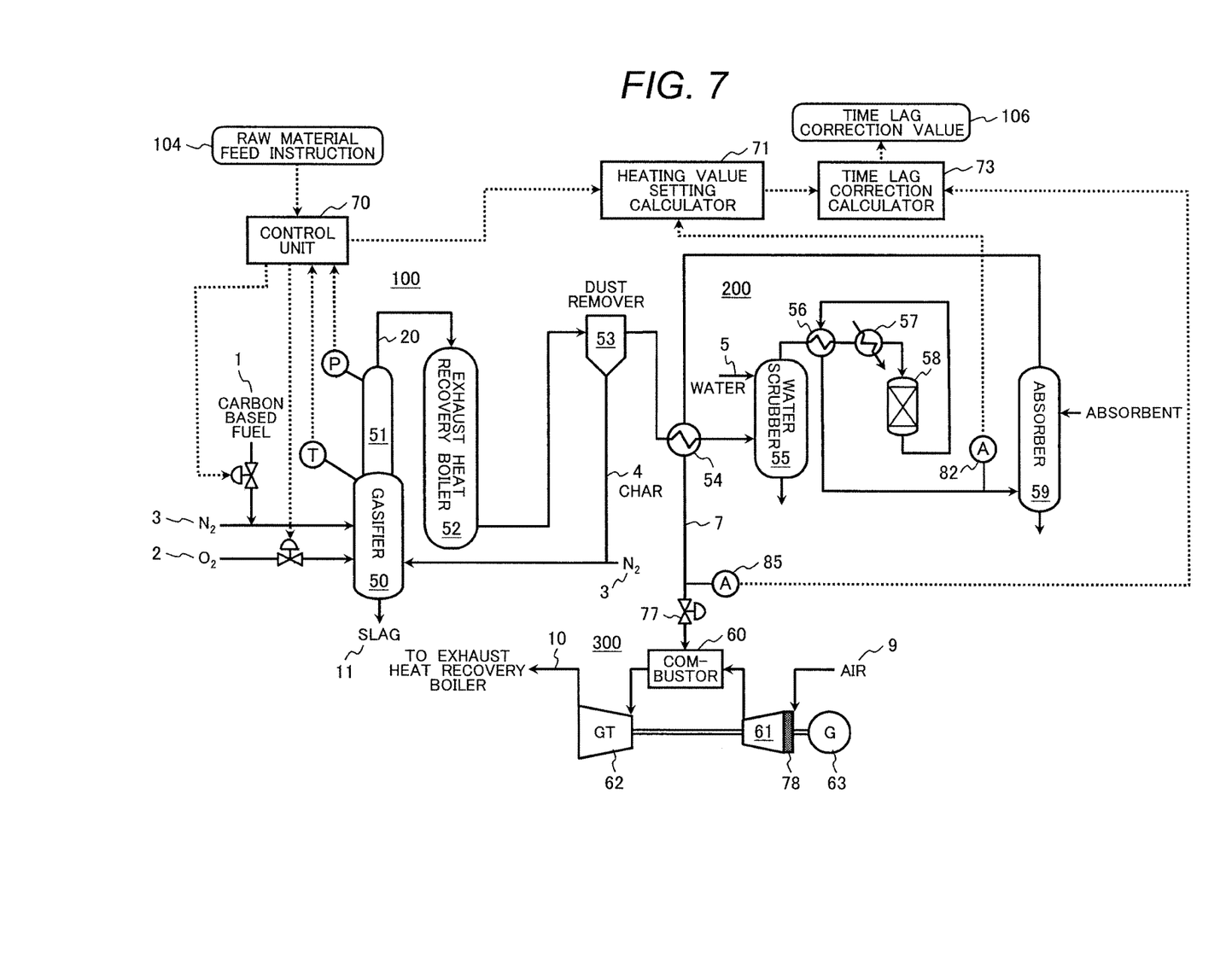
FIG. 7 is a system configuration diagram showing the gasification power generation system of the third embodiment of the present invention setting the heating value of the syngas at the gas turbine inlet used to control the gas turbine equipment from the raw material feed rate to the gasifier.

In the control method for the gasification power generation system of this embodiment shown in FIG. 7 as shown in FIGS. 3A and 3B, there exists a time lag until the heating value of the syngas 7 fed to the gas turbine equipment 300 at the gas turbine inlet is changed after the raw material feed rate to the gasifier 50 is changed.

The time lag t, in the control method for the gasification power generation system of this embodiment, can be obtained by adding the calculation of the following Formula (1) to the configuration similar to the case of the operation of the time lag calculation 122 installed on the heating value setting calculator 71 of the gasification power generation system of the first embodiment and second embodiment and performing the operation.

$$t=[\Sigma(Vi \times Pi \times Ti)]/F \qquad (1)$$

where t: time lag,
V: volume of i-th instrument or pipe,
Pi: gas pressure in i-th instrument or pipe,
Ti: gas temperature in i-th instrument or pipe, and
F: syngas flow rate in a standard state.

In the gasification power generation system of the first embodiment and second embodiment, since there is a case that the gas pressure and gas temperature are not measured in all the instruments or pipes configuring the gasification power generation system, in the control method for the gasification power generation system of this embodiment, when calculating and obtaining the time lag by Formula (1) provided for the operation of the time lag calculation 122 installed on the heating value setting calculator 71, the material balance and heat balance planned values are input to the heating value setting calculator 71 and is used, and for the instruments or pipes with the gas pressure and gas temperature not measured, the value of the instrument, on the upstream side or the downstream side is substituted.

Further, since there is nitrogen flow-in between the gasifier 50 and the gas turbine equipment 300 and there exists a system for recycling a part of the syngas 20 to the instrument on the upstream side, the syngas quantity of the syngas 20 generated in the gasifier 50 may be different from the value calculated by the gasifier model and the value measured at the inlet of the absorber 59.

Therefore, the time lag obtained by Formula (1) may be different from the actual value. Therefore, in the control method for the gasification power generation system of this embodiment, the time lag is corrected, and a method of obtaining the time lag corrected value will be explained below by referring to FIG. 7.

In the control method for the gasification power generation system of this embodiment shown in FIG. 7, by the heating value setting calculator 71, the syngas heating value of the syngas 20 at the gasifier outlet 50 is obtained from the raw material feed rate and the change with time thereof is memorized.

Next, the syngas 7 at the gas turbine inlet fed to the gas turbine equipment 300 is sampled, and the syngas 7 is led to a gas composition analyzer 85, and by the gas composition analyzer 85, the concentrations of carbon monoxide, hydrogen, and methane which are flammable components in the syngas 7 are measured.

The concentrations, measured by the gas composition analyzer 85, of carbon monoxide, hydrogen, and methane which are flammable components in the syngas 7 are input to a measurement time lag correction calculator 73, and by the measurement time lag correction calculator 73, these measured values are multiplied by the respective heating values, thus the syngas heating value of the syngas 7 at the gas turbine inlet which is fed to the gas turbine equipment 300 is obtained, and the change with time of the heating value of the syngas 7 at the gas turbine inlet is memorized.

As a method of obtaining the syngas heating value at the gas turbine inlet, in addition to the aforementioned method, a method of inferring on assumption that each heating value is in proportion to the highest concentration of carbon monoxide and an inferring method using the ratio of carbon monoxide and carbon dioxide can be used.

As shown in FIGS. 3A and 3B, the change with time of the heating value at the gasifier outlet 50 and the change with time of the heating value at the gas turbine inlet have an almost similar shape.

Therefore, time lag is added to the change with time of the heating value of the syngas 20 at the gasifier outlet 50 successively and the value obtained when the change with time becomes equal to the change with time of the heating value of the syngas 7 at the gas turbine inlet is assumed as a true time lag.

And, the value obtained by subtracting the time lag calculated by the heating value setting calculator 71 from the true time lag is assumed as a time lag correction value 106.

The time lag correction value 106 is obtained when changing the power generation output at the start time of the gas turbine equipment 300 of the gasification power generation system. Thereafter, the time lag correction value 106 is calculated whenever the operation of changing the power generation output of the gas turbine equipment 300 depending on the electricity demand is performed, and is updated.

Namely, in the control method for the gasification power generation system of this embodiment, the syngas heating value inferred from the feed rate of the carbon based fuel fed to the gasifier of the gasifying equipment is set as a heating value of the syngas at the as turbine equipment inlet after the time lag inferred from the syngas quantity, the volumes of the instruments and the pipes between the gasifier and the gas turbine equipment, and the gas temperatures and pressures in the instruments and the pipes, and the change with time when the syngas heating value at the gasifier outlet is inferred from the property and feed rate of the carbon based fuel fed to the gasifier, the flow rate of nitrogen or water used to transfer the carbon based fuel to the gasifier, and the property and feed rate of the oxidizing agent fed to the gasifier is memorized, and using the analytical value of the syngas sampled from the pipe at the gas turbine inlet, the change with time of the syngas heating value is obtained, and the time lag for delaying the change with time of the syngas heating value inferred value is obtained so as to make this change with time equal to the aforementioned chance with time of the inferred value of the syngas heating value, and at the time of operation of changing the power generation output of the gas turbine equipment using the value obtained by subtracting the time lag inferred from the syngas quantity, the volumes of the instruments and the pipes between the gasifier and the gas turbine equipment, and the gas temperatures and pressures in the instruments and the pipes from this time lag as a time lag correction value, the time lag inferred from the syngas quantity, the volumes of the instruments and the pipes between the gasifier and the gas turbine equipment, and the as temperatures and pressures in the instruments and the pipes is used as a time lag until the syngas heating value is changed at the inlet of the gas turbine equipment after the feed rate of the carbon based fuel fed to the gasifier is changed, thus the gas turbine equipment is controlled.

Even in the gasification power generation system of this embodiment, the heating value setting calculator 71 for calculating the set value of the heating value of the syngas 7 fed to the gas turbine equipment 300 is installed, so that the gas turbine control unit 72 calculates the control signal by the output of the heating value set value of the syngas 7 calculated by the heating value setting calculator 71 for setting the heating value of the syngas 7, operates the opening angle of the fuel flow rate control valve 77 on the basis of the operation signal calculated by the gas turbine control unit 72, appropriately adjusts the fuel flow rate of the syngas 7 fed to the gas turbine combustor 60 of the gas turbine equipment 300, and thereby controls the gas turbine equipment 300.

Further, the gas turbine control unit 72 calculates also the air quantity corresponding to the fuel flow rate of the syngas 7 fed to the gas turbine combustor 60 of the gas turbine equipment 300, operates the gas turbine air flow rate control valve 78 on the basis of the operation signal calculated by the gas turbine control unit 72, appropriately adjusts the flow rate of the air 9 fed to the gas turbine compressor 61 configuring the gas turbine equipment 300, and thereby controls the gas turbine equipment 800.

According to this embodiment, even when the power generation output fluctuates depending on the electricity demand, the heating value of the syngas generated in the gasifier used to control the as turbine is set accurately and the syngas quantity and air quantity fed to the gas turbine combustor can be adjusted to appropriate values, so that a control method for a gasification power generation system for maintaining stably the combustion of the gas turbine combustor can be realized.

Further, as an additional effect of this embodiment, the aforementioned control method for the gasification power generation system is realized, so that the increase of the discharge quantity of nitrogen oxide or carbon monoxide is suppressed and troubles such as flame going-out of the gas turbine combustor and damage to the gas turbine combustor due to a high-temperature flame can be prevented.

The invention claimed is:

1. A control method for a gasification power generation system including gasifying equipment for gasifying carbon-based fuel with an oxidizing agent in a gasifier and for generating syngas, a gas clean-up unit for obtaining purified syngas by removing a sulfur compound from the syngas, gas turbine equipment for generating power by burning the purified syngas as fuel, and instruments and pipes connected between the gasifier and the gas turbine equipment, comprising the steps of:

inferring a syngas heating value at a gasifier outlet based on a constant ratio of a feed rate of the carbon-based fuel fed to the gasifier to a feed rate of the oxidizing agent;

using a first function which relates a variable feed rate of the carbon-based fuel fed to the gasifier with first resultant syngas heating values at the gasifier outlet;

analyzing the syngas sampled from a flow of syngas provided to the gas turbine equipment from the gasifier to determine analytical values of the sampled syngas, and correcting the inferred syngas heating value using the analytical values;

modifying the corrected inferred syngas heating value at the gasifier outlet using a second function relating a variable ratio of the feed rate of the carbon-based fuel fed to the gasifier to the feed rate of the oxidizing agent with second resultant syngas heating values at the gasifier outlet;

inferring a time lag until a received syngas heating value at an inlet to the gas turbine equipment changes after a change in the feed rate of the carbon-based fuel fed to the gasifier, the time lag being inferred from: (I) a syngas quantity measured by a gas flow rate meter installed on a pipe connected between the gasifier and the gas turbine equipment, (II) a volumes of the instruments and the pipes connected between the gasifier and the gas turbine equipment, and (III) gas temperatures and pressures in the instruments and the pipes connected between the gasifier and the gas turbine equipment;

setting the modified corrected inferred syngas heating value as a control syngas heating value after the inferred time lag; and controlling the gas turbine equipment and adjusting air and syngas flow to the gas turbine equipment based on the control syngas heating value.

2. The control method for the gasification power generation system according to claim 1, further comprising the step of:

measuring a concentration of at least one of carbon monoxide, hydrogen, and methane in the sampled syngas.

3. The control method for the gasification power generation system according to claim 1, further comprising the step of:

measuring a concentration of carbon monoxide and a concentration of carbon dioxide among components in the sampled syngas.

* * * * *